United States Patent [19]

Sadler et al.

[11] Patent Number: 5,904,873
[45] Date of Patent: May 18, 1999

[54] HOCKEY STICK BLADE REMOVAL SYSTEM

[76] Inventors: Bill Sadler, P.O. Box 182; Lorne Pickering, P.O. Box 2657, both of Golden, BC, Canada, V0A-1H0

[21] Appl. No.: 08/901,163

[22] Filed: Jul. 28, 1997

[51] Int. Cl.⁶ .................................................. H05B 3/58
[52] U.S. Cl. ................................. 219/535; 473/560
[58] Field of Search ............................... 473/560, 561, 473/562, 563; 219/535, 536, 538, 408, 391, 402

[56] References Cited

U.S. PATENT DOCUMENTS

| | | | |
|---|---|---|---|
| 3,861,680 | 1/1975 | Mowrer | 473/166 |
| 5,021,635 | 6/1991 | Willett | 219/408 |
| 5,520,385 | 5/1996 | Quigley et al. | 473/562 |
| 5,628,509 | 5/1997 | Christian | 473/562 |
| 5,690,850 | 11/1997 | Anderson | 219/535 |

*Primary Examiner*—Raleigh W. Chiu

[57] ABSTRACT

A hockey stick blade removal system including a housing having an opening through a front wall thereof. The opening is dimensioned for receiving a hockey blade and associated stick therein for positioning within the housing. A timer controlled heat gun is secured to an interior surface of the front wall of the housing disposed above the opening therethrough.

8 Claims, 3 Drawing Sheets

HOCKEY STICK BLADE REMOVAL SYSTEM

BACKGROUND OF THE INVENTION

1. Field of the Invention

The present invention relates to a hockey stick blade removal system and more particularly pertains to removing and replacing broken hockey stick blades with a hockey stick blade removal system.

2. Description of the Prior Art

The use of heat guns is known in the prior art. More specifically, heat guns heretofore devised and utilized for the purpose of producing heat are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,996,972 to Poston; U.S. Pat. No. 5,156,542 to Hannen et al.; U.S. Pat. No. 4,788,413 to Eng; U.S. Pat. No. 4,291,597 to Allen; U.S. Pat. No. 5,031,486 to Rydgren; and U.S. Pat. No. Des. 334,876 to Swetish.

While these devices fulfill their respective, particular objective and requirements, the aforementioned patents do not describe a hockey stick blade removal system for removing and replacing broken hockey stick blades.

In this respect, the hockey stick blade removal system according to the present invention substantially departs from the conventional concepts and designs of the prior art, and in doing so provides an apparatus primarily developed for the purpose of removing and replacing broken hockey stick blades.

Therefore, it can be appreciated that there exists a continuing need for new and improved hockey stick blade removal system which can be used for removing and replacing broken hockey stick blades. In this regard, the present invention substantially fulfills this need.

SUMMARY OF THE INVENTION

In the view of the foregoing disadvantages inherent in the known types of heat guns now present in the prior art, the present invention provides an improved hockey stick blade removal system. As such, the general purpose of the present invention, which will be described subsequently in greater detail, is to provide a new and improved hockey stick blade removal system and method which has all the advantages of the prior art and none of the disadvantages.

To attain this, the present invention essentially comprises a housing having a top wall, a front wall, a rear wall, a pair of side walls and a downwardly tapering opened lower end. The rear wall is secured to wall surface. The top wall has vented openings therethrough. The front wall has an opening therethrough. The opening is dimensioned for receiving a hockey blade and associated stick therein for positioning within the housing. The opening is defined by a wide upper portion, a narrower intermediate portion and a downwardly tapering lower portion. One of the side walls has a recess formed therein. A timer controlled heat gun is secured to an interior surface of the front wall of the housing disposed above the opening therethrough with the vented openings being disposed thereabove. A coin activated power source is secured to the top wall of the housing. The power source has a cord extending within the housing for electrical coupling with the timer controlled heat gun. The power source has a power cord extending downwardly for coupling with an electrical outlet. A plug remover is positioned within the recess in the side wall of the housing. The plug remover comprises a corkscrew pivotally secured within the recess.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hockey stick blade removal system which has all the advantages of the prior art heat guns and none of the disadvantages.

It is another object of the present invention to provide a new and improved hockey stick blade removal system which may be easily and efficiently manufactured and marketed.

It is a further object of the present invention to provide a new and improved hockey stick blade removal system which is of durable and reliable construction.

An even further object of the present invention is to provide a new and improved hockey stick blade removal system which is susceptible of a low cost of manufacture with regard to both materials and labor, and which accordingly is then susceptible of low prices of sale to the consuming public, thereby making such a hockey stick blade removal system economically available to the buying public.

Even still another object of the present invention is to provide a new and improved hockey stick blade removal system for removing and replacing broken hockey stick blades.

Lastly, it is an object of the present invention to provide a new and improved hockey stick blade removal system including a housing having an opening through a front wall thereof. The opening is dimensioned for receiving a hockey blade and associated stick therein for positioning within the housing. A timer controlled heat gun is secured to an interior surface of the front wall of the housing disposed above the opening therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
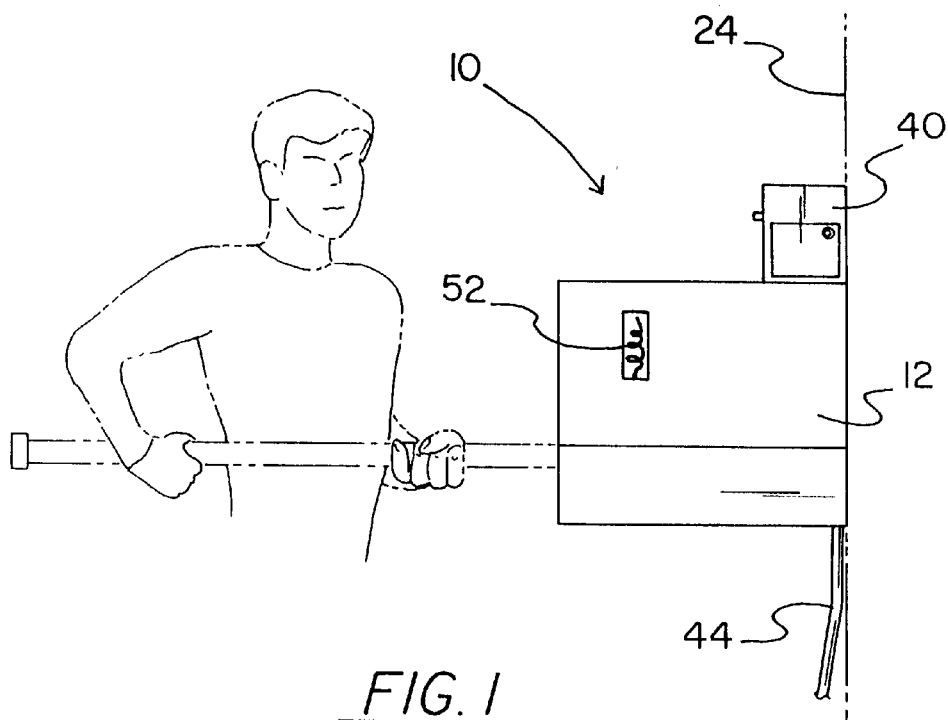
FIG. 1 is a side view of the preferred embodiment of the hockey stick blade removal system constructed in accordance with the principles of the present invention.
Figure 2:
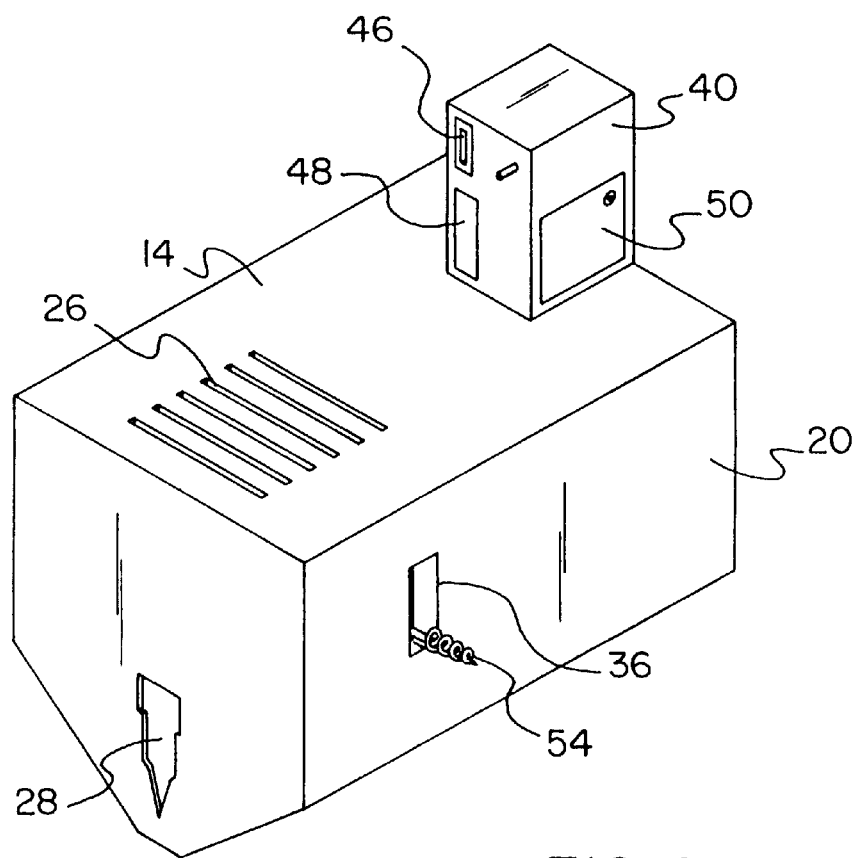
FIG. 2 is a plan perspective view of the present invention.
Figures 3, 4:
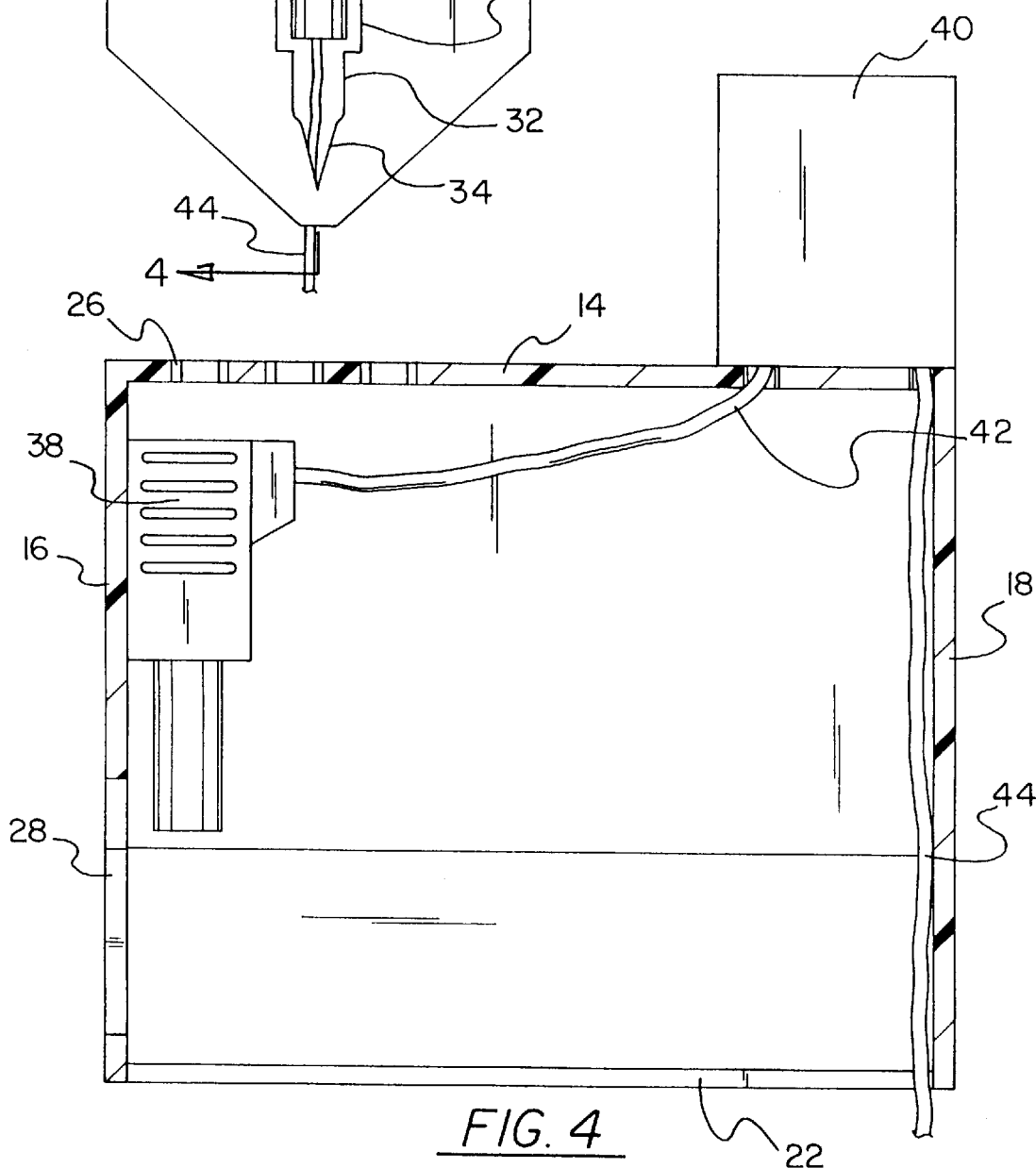
FIG. 3 is a front elevation view of the present invention.
FIG. 4 is a cross-sectional view as taken along line 4—4 of FIG. 3.

With reference now to the drawings, and in particular, to FIGS. 1 through 6 thereof, the preferred embodiment of the new and improved hockey stick blade removal system embodying the principles and concepts of the present invention and generally designated by the reference number 10 will be described.

Specifically, it will be noted in the various Figures that the device relates to a hockey stick blade removal system for removing and replacing broken hockey stick blades. In its broadest context, the device consists of a housing, a timer controlled heat gun, a coin activated power source and a plug remover. Such components are individually configured and correlated with respect to each other so as to attain the desired objective.

The housing 12 has a top wall 14, a front wall 16, a rear wall 18, a pair of side walls 20 and a downwardly tapering opened lower end 22. The rear wall 16 is secured to wall surface 24. The top wall 14 has vented openings 26 therethrough. The front wall 14 has an opening 28 therethrough. The opening 28 is dimensioned for receiving a hockey blade and associated stick therein for positioning within the housing 12. The opening 28 is defined by a wide upper portion 30, a narrower intermediate portion 32 and a downwardly tapering lower portion 34. One of the side walls 20 has a recess 36 formed therein.

The timer controlled heat gun 38 is secured to an interior surface of the front wall 16 of the housing 12 disposed above the opening 28 therethrough with the vented openings 26 being disposed thereabove. Note FIG. 4. The heat gun 38 is used to heat the joints where the shaft of the hockey stick meats the blade thoroughly and evenly. Once the heating has finished, the stick is lowered into the "jaws" or lower portion 34, and the user can pull backward on the stick to release the blade from the shaft whereupon the separated blade will fall outwardly of the housing 12 through the downwardly tapered open lower end 22 of the housing 12.

The coin activated power source 40 is secured to the top wall 14 of the housing 12. The power source 40 has a cord 42 extending within the housing 12 for electrical coupling with the timer controlled heat gun 38. The power source 40 has a power cord 44 extending downwardly for coupling with an electrical outlet (not illustrated). The power source 40 is provided with a coin slot 46, a coin return slot 48 and a removable access door 50 for removal of coins.

The plug remover 52 is positioned within the recess 36 in the side wall 20 of the housing 12. The plug remover 52 comprises a corkscrew 54 pivotally secured within the recess 36. The corkscrew 54 is used in order to remove broken blade ends out of the shaft of the hockey stick.

Figure 5:
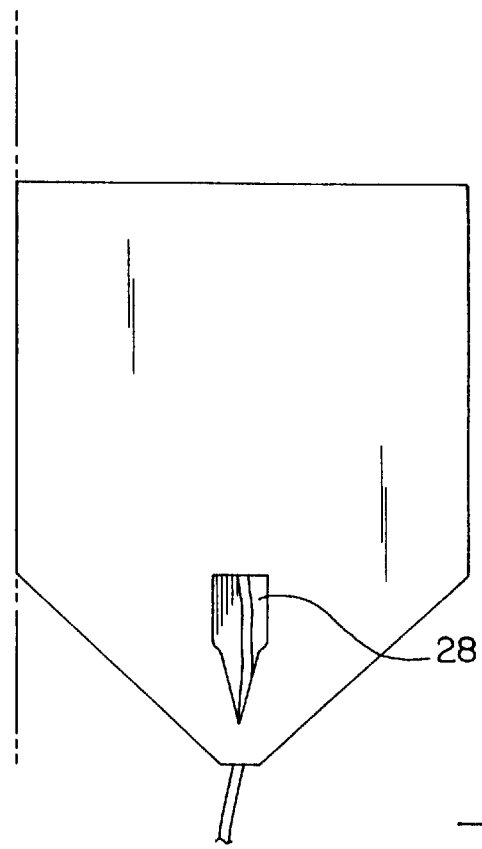
FIG. 5 is a front elevation view of a second embodiment of the present invention.
Figure 6:
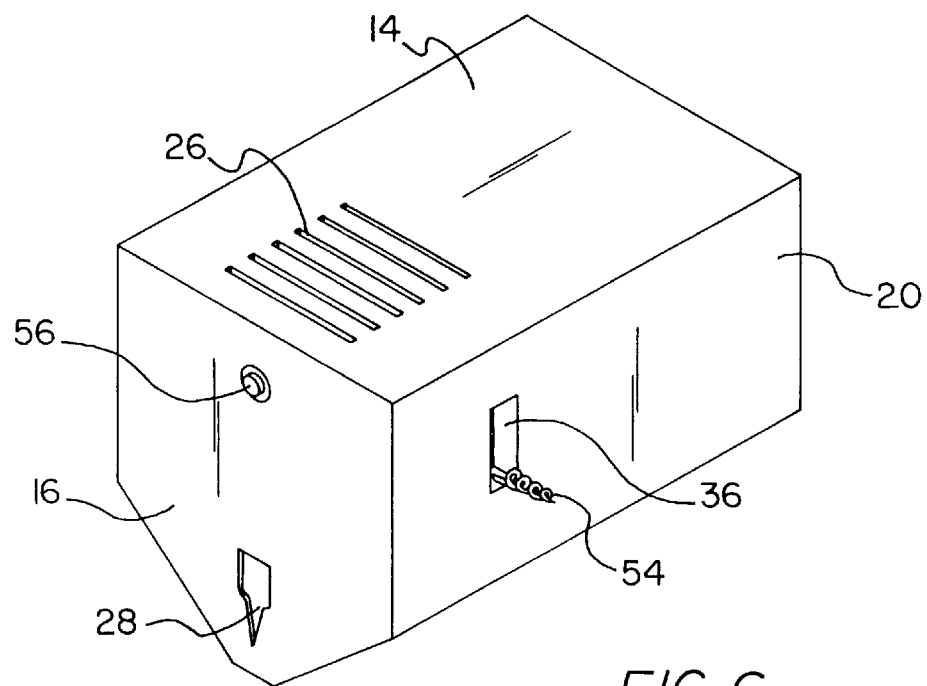
FIG. 6 is a plan perspective view of the second embodiment of the present invention.

A second embodiment of the present invention is shown in FIGS. 5 and 6 and includes substantially all of the components of the present invention except that the coin activated power source 40 is replaced by a simple activation power button 56 with a power cord extending directly from the heat gun 38 to be coupled with the electrical outlet.

Aluminum hockey sticks were invented for the consumer. The idea is a reusable aluminum or graphite shaft with inexpensive replaceable blades, wooden for ice hockey, plastic for street or roller hockey. The aluminum shaft of the stick is hollow and the wooden blade slides inside. Heat is required to expand the aluminum to allow the blade to be quickly inserted before the shaft contracts. The contracting of the aluminum around the wood holds the blade in place. The blade also has a small amount of glue on the area that is inserted into the shaft to help hold the joint together. This glue becomes malleable when heat is applied.

It is inconvenient to have to change a blade during a game as heat is required to do so. Directions on the shaft may state that a hair/hand dryer will provide sufficient heat. This is not the case. The only way to remove a blade is with a torch. Owners of aluminum sticks should have a torch in their bag, but may not always be able to find a light as not many hockey players smoke. These torches are used by players of all ages including minor hockey players. The fire potential is a major safety concern in many areas as most hockey equipment is composed of synthetic materials. A torch in a dressing area full of nylon is dangerous. Open flame in any public facility should be avoided.

The present invention is a wall-mounted unit that contains a commercial heat source powerful enough to expand the aluminum. The heat source is simply an industrial heat gun or paint stripper. Once the shaft is expanded and the glue has softened, the blade is wedged into the blade jaws wherein a quick pull will eject the blade and a new blade can then be inserted.

On the newer graphite shafts an open flame cannot be used as it will damage the hockey stick. The present invention will not damage hockey sticks.

Should a blade break or shear off at the joint making it impossible to wedge into the blade jaws for removal, then the plug remover on the side housing is used. The butt end with the sheared-off blade plug inside is heated as is normally done and then can be twisted onto the plug remover and pulled out.

The present invention can also be used to alter the "curve" of a blade on any stick. This is a popular art among players. Plastic blades soften when heated to allow bending to be possible. A conventional wooden blade is actually veneered with fibre glass so it can be molded and formed when heated.

The present invention is convenient and safe. It is less time consuming and requires no tools. It is mounted on a wall behind a players' bench and would allow any player to perform the change between shifts without having to go on a scavenger hunt for a torch, matches, etc. Thus, the present invention is now user friendly. The present invention would prevent aluminum shaft owners from reverting back to conventional sticks due to the inconvenience in changing a blade. The present invention would also be a good advertisement for the stick producer.

The use of open flames can now be banned from public facilities, thus lowering the fire and potential burn risk. There is also less risk of vandalism, as torches can be used to deface property resulting in loss of property value. The present invention will reduce the number of requests for torches, matches, screwdrivers, long screws, pliers and the like in order to remove sheared-off blades. Facility owners may remove signs that state the arena no longer provides torches, as the number of requests is overwhelming.

Once the initial purchase of an aluminum or graphite shaft is made, the costs of replacing a blade versus a stick can be as low or lower than 25% of the cost of a stick. The average cost of a stick is about $30 so an aluminum stick can be a great advantage. Another advantage is that one shaft and several compact blades that fit in a player's equipment bag are easier to transport that several bulky sticks.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A hockey stick blade removal system for removing and replacing broken hockey stick blades comprising, in combination:

a housing having a top wall, a front wall, a rear wall, a pair of side walls and a downwardly tapering opened lower end, the rear wall secured to wall surface, the top wall having vented openings therethrough, the front wall having an opening therethrough, the opening being dimensioned for receiving a hockey blade and associated stick therein for positioning within the housing, the opening being defined by a wide upper portion, a narrower intermediate portion and a downwardly tapering lower portion, one of the side walls having a recess formed therein;

a timer controlled heat gun secured to an interior surface of the front wall of the housing disposed above the opening therethrough with the vented openings being disposed thereabove;

a coin activated power source secured to the top wall of the housing, the power source having a cord extending within the housing for electrical coupling with the timer controlled heat gun, the power source having a power cord extending downwardly therefrom for coupling with an electrical outlet; and a plug remover positioned within the recess in the side wall of the housing, the plug remover comprising a corkscrew pivotally secured within the recess.

2. A hockey stick blade removal system comprising:

a housing having an opening through a front wall thereof, the opening being dimensioned for receiving a hockey blade and associated stick therein for positioning within the housing;

a timer controlled heat gun secured to an interior surface of the front wall of the housing disposed above the opening therethrough;

a coin activated power source secured to the housing;

a plug remover positioned within a recess formed in the housing.

3. The hockey stick blade removal system as set forth in claim 2 wherein the opening is defined by a wide upper portion, a narrower intermediate portion and a downwardly tapering lower portion.

4. The hockey stick blade removal system as set forth in claim 2 wherein the power source having a cord extending within the housing for electrical coupling with the timer controlled heat gun, the power source having a power cord extending downwardly therefrom for coupling with an electrical outlet.

5. The hockey stick blade removal system as set forth in claim 2 wherein the plug remover comprises a corkscrew pivotally secured within the recess.

6. The hockey stick removal system as set forth in claim 2 and further including a power button positioned within the front wall of the housing, the power button being in communication with the timer controlled heat gun.

7. The hockey stick removal system as set forth in claim 2 wherein the time and temperature of use are sufficient to remove a blade from a shaft.

8. The hockey stick removal system as set forth in claim 2 wherein the time and temperature of use are sufficient to alter the curvature of a blade.

* * * * *